(12) United States Patent
Koiwa et al.

(10) Patent No.: US 8,876,641 B2
(45) Date of Patent: Nov. 4, 2014

(54) CHAIN TENSIONER DEVICE

(75) Inventors: Yojiro Koiwa, Wako (JP); Shinji Yamada, Wako (JP); Masao Seki, Wako (JP); Tomohiro Wakabayashi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 272 days.

(21) Appl. No.: 13/175,966

(22) Filed: Jul. 5, 2011

(65) Prior Publication Data

US 2012/0052996 A1 Mar. 1, 2012

(30) Foreign Application Priority Data

Aug. 27, 2010 (JP) .................................. 2010-190488

(51) Int. Cl.
*F16H 7/00* (2006.01)
*F16H 7/08* (2006.01)

(52) U.S. Cl.
CPC ...... *F16H 7/0848* (2013.01); *F16H 2007/0814* (2013.01); *F16H 2007/0812* (2013.01); *F16H 2007/0806* (2013.01); *F16H 2007/0893* (2013.01); *F16H 2007/0872* (2013.01); *F16H 2007/0859* (2013.01)
USPC ........................................................ 474/111

(58) Field of Classification Search
CPC .............. F16H 7/08; F16H 2007/0812; F16H 2007/0846; F16H 7/0848; F16H 2007/0859; F16H 2007/0861; F16H 2007/0872; F16H 207/0893
USPC ........................................................ 474/111
See application file for complete search history.

(56) References Cited

U.S. PATENT DOCUMENTS

| 2,210,276 | A | * | 8/1940 | Bremer ......................... 474/110 |
| 4,245,518 | A | * | 1/1981 | Toyokuni et al. ............. 474/111 |
| 4,530,681 | A | * | 7/1985 | Kurata et al. .................. 474/111 |
| 4,553,509 | A | * | 11/1985 | Mezger et al. .............. 123/90.27 |
| 4,741,299 | A | * | 5/1988 | Matsuura et al. ........... 123/90.31 |
| 6,431,133 | B2 | * | 8/2002 | Brandl et al. ............... 123/90.31 |
| 7,033,295 | B2 | * | 4/2006 | Garbagnati et al. .......... 474/110 |
| 7,074,146 | B2 | * | 7/2006 | Fujikubo et al. .............. 474/111 |
| 2003/0228948 | A1 | * | 12/2003 | Garbagnati et al. .......... 474/110 |
| 2004/0106484 | A1 | * | 6/2004 | Sonobata ....................... 474/111 |
| 2009/0258737 | A1 | * | 10/2009 | Muguruma et al. .......... 474/111 |

FOREIGN PATENT DOCUMENTS

| JP | 60-86665 U | 6/1985 |
| JP | 2009-47248 A | 3/2009 |

OTHER PUBLICATIONS

Japanese Office Action for corresponding JP Application No. 2010-190488, Jun. 7, 2012.

* cited by examiner

*Primary Examiner* — Henry Liu
(74) *Attorney, Agent, or Firm* — Mori & Ward, LLP

(57) ABSTRACT

A chain tensioner device includes a main arm, tensioner lifter, and a sub-arm. The main arm is pivotally supported by a first shaft. The main arm slidably contacts an endless chain to apply a tension to the endless chain. The tensioner lifter includes a housing, a plunger, and a spring. The plunger is slidably held by the housing. The spring is to press the plunger such that the plunger projects from the housing. The sub-arm is disposed between the main arm and the tensioner lifter. The sub-arm is pivotally supported by a second shaft to transmit a biasing force applied by the plunger of the tensioner lifter to the main arm. A moving direction of the plunger is substantially orthogonal to a direction of a tangent at a contact portion between the plunger and the sub-arm when an elongation of the endless chain reaches a maximum elongation.

4 Claims, 13 Drawing Sheets

CHAIN TENSIONER DEVICE

CROSS-REFERENCE TO RELATED APPLICATIONS

The present application claims priority under 35 U.S.C. §119 to Japanese Patent Application No. 2010-190488 filed Aug. 27, 2010, entitled "Chain Tensioner Device". The contents of this application are incorporated herein by reference in their entirety.

BACKGROUND OF THE INVENTION

1. Field of the Invention

The present invention relates to a chain tensioner device.

2. Description of the Related Art

Such a chain tensioner device is well known as disclosed in Japanese Unexamined Utility Model Registration Application Publication No. 60-86665.

In this chain tensioner device, the lever ratio of a sub-arm is set to a large value so that a main arm can be pressed into contact with an endless chain under an appropriate load while a spring with a large spring constant is used. Furthermore, even if the endless chain elongates over time due to, for example, wearing away, the stretch of the spring is reduced to minimize fluctuations in the load at which the main arm presses the endless chain.

SUMMARY OF THE INVENTION

According to one aspect of the present invention, a chain tensioner device includes a main arm, a tensioner lifter, and a sub-arm. The main arm is pivotally supported by a first shaft. The main arm slidably contacts an endless chain to apply a tension to the endless chain. The endless chain is wound around a drive sprocket connected to a drive shaft and a driven sprocket connected to a driven shaft. The tensioner lifter includes a housing, a plunger, and a spring. The plunger is slidably held by the housing. The spring is to press the plunger such that the plunger projects from the housing in order to generate a biasing force to press the main arm toward the endless chain. The sub-arm is disposed between the main arm and the tensioner lifter. The sub-arm is pivotally supported by a second shaft to transmit the biasing force applied by the plunger of the tensioner lifter to the main arm. A moving direction of the plunger is substantially orthogonal to a direction of a tangent at a contact portion between an abutting portion of the plunger and an abutting portion of the sub-arm when an elongation of the endless chain reaches a maximum elongation.

According to another aspect of the present invention, a chain tensioner device includes a main arm, a tensioner lifter, and a sub-arm. The main arm is pivotally supported by a first shaft. The main arm slidably contacts an endless chain to apply a tension to the endless chain. The endless chain is wound around a drive sprocket connected to a drive shaft and a driven sprocket connected to a driven shaft. The tensioner lifter includes a housing, a plunger, and a spring. The plunger is slidably held by the housing. The spring is to press the plunger such that the plunger projects from the housing in order to generate a biasing force to press the main arm toward the endless chain. The sub-arm is disposed between the main arm and the tensioner lifter. The sub-arm is pivotally supported by a second shaft to transmit the biasing force applied by the plunger of the tensioner lifter to the main arm. An abutting portion of the sub-arm and an abutting portion of the main arm are positioned on a line connecting the first shaft to the second shaft or on an opposite side of the line from the endless chain.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
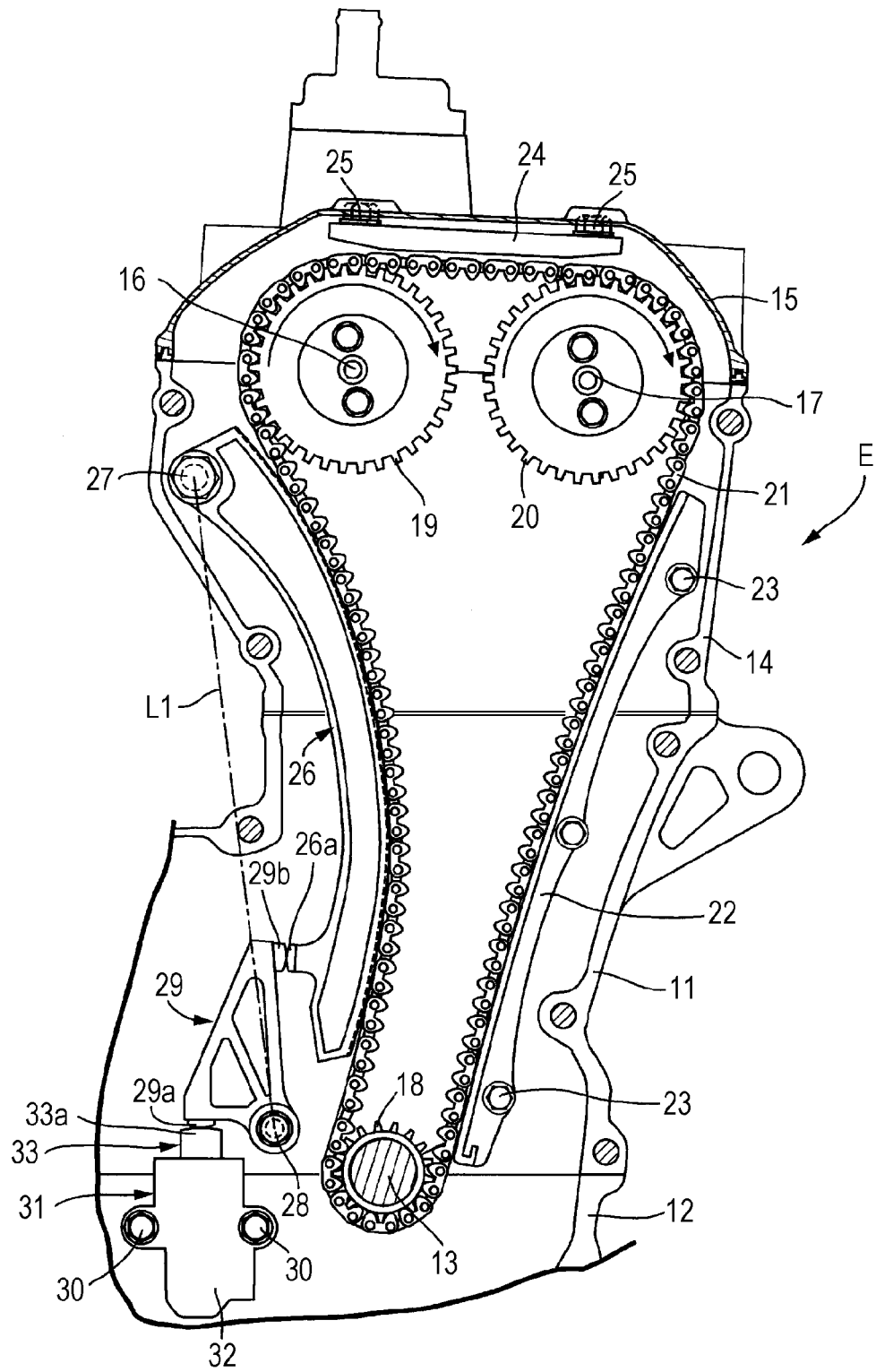
FIG. 1 is a front view of part of an engine uncovered with a chain cover in a first embodiment of the present invention.

The embodiments will now be described with reference to the accompanying drawings, wherein like reference numerals designate corresponding or identical elements throughout the various drawings.

A chain tensioner device according to a first embodiment of the present invention will be described with reference to FIGS. 1 to 7.

Referring to FIG. 1, a crankshaft 13 is rotatably supported between a cylinder block 11 of an engine E and a crankcase 12 connected to the lower surface of the cylinder block 11. An intake camshaft 16 and an exhaust camshaft 17 are rotatably supported between a cylinder head 14 connected to the upper surface of the cylinder block 11 and a head cover 15 connected to the upper surface of the cylinder head 14. A timing chain 21, serving as an endless chain, is wound around a drive sprocket 18 mounted on one end of the crankshaft 13 and two driven sprockets 19 and 20 mounted on respective ends of the intake camshaft 16 and the exhaust camshaft 17. The intake camshaft 16 and the exhaust camshaft 17 are driven at half the number of revolutions of the crankshaft 13.

A first fixed chain guide 22 is in sliding contact with tight part of the timing chain 21, the tight part being positioned between the drive sprocket 18 and the driven sprocket 20 on the exhaust camshaft 17. The first fixed chain guide 22 is fixed with bolts 23 such that the chain guide extends over the cylinder block 11 and the cylinder head 14. A second fixed chain guide 24 is in sliding contact with another part of the timing chain 21, the other part being positioned between the two driven sprockets 19 and 20 on the intake camshaft 16 and the exhaust camshaft 17. The second fixed chain guide 24 is fixed to the head cover 15 with bolts 25.

A main arm 26 is in sliding contact with slack part of the timing chain 21, the slack part being positioned between the drive sprocket 18 and the driven sprocket 19 on the intake camshaft 16. The upper end of the main arm 26 is pivotally attached through a first shaft 27 to the cylinder head 14 such that the main arm 26 is swingable. The lower end of a sub-arm 29 is pivotally attached through a second shaft 28 to the cylinder block 11 such that the sub-arm 29 is swingable. A hydraulic tensioner lifter 31, fixed to the cylinder block 11 with two bolts 30, presses the main arm 26 against the timing chain 21 through the sub-arm 29 to provide a predetermined tension in order to prevent looseness of the timing chain 21.

Figure 2:
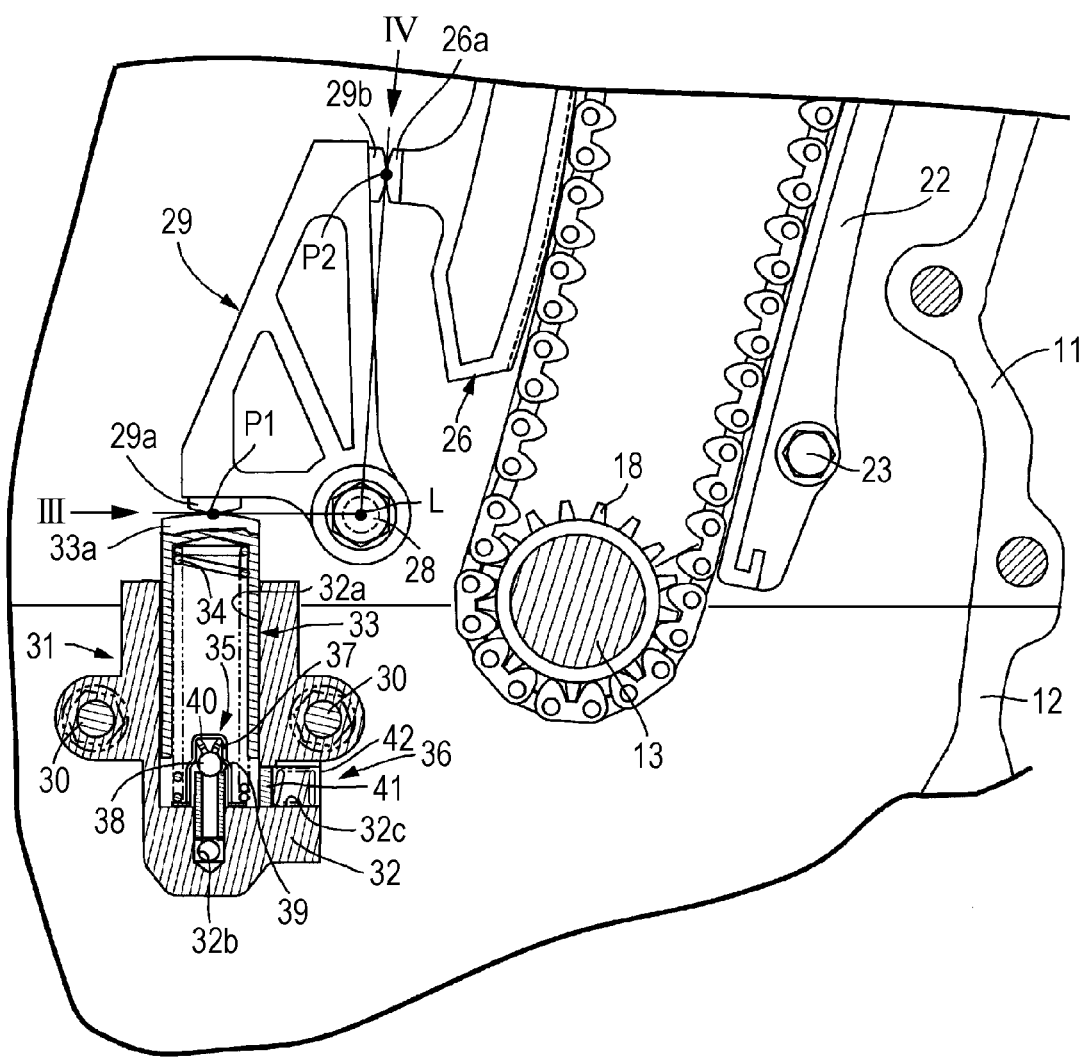
FIG. 2 is an enlarged view of substantial part of FIG. 1.
Figure 3:
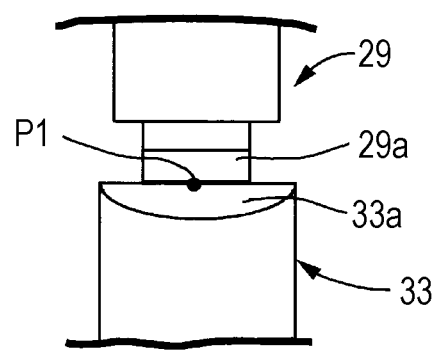
FIG. 3 is a plan view of part as viewed in the direction of arrow III in FIG. 2.
Figure 4:
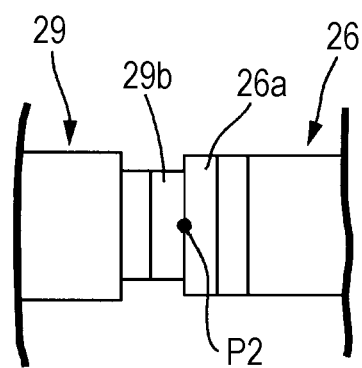
FIG. 4 is a plan view of part as viewed in the direction of arrow IV in FIG. 2.

FIGS. 2 and 4 demonstrate that the tensioner lifter 31 includes a tensioner housing 32 fixed to the cylinder block 11 with the bolts 30, a plunger 33 slidably fitted in a cylinder 32a disposed in the tensioner housing 32, a spring 34 that biases the plunger 33 such that the plunger 33 projects from the cylinder 32a, a check valve 35 that supplies hydraulic oil to the cylinder 32a, and a relief valve 36 that discharges the hydraulic oil from the cylinder 32a. A biasing force, generated by the plunger 33, can be increased or decreased by controlling the magnitude of oil pressure of the hydraulic oil or the magnitude of elastic force of the spring 34.

The check valve 35 includes a check ball 38 received in a valve housing 37 and a valve spring 40 that urges the check ball 38 such that the check ball 38 is seated in a valve seat 39. The hydraulic oil, supplied from an oil pump (not illustrated), is supplied to the rear of the valve seat 39 through an oil path 32b disposed in the tensioner housing 32. The relief valve 36 includes a piston 41 placed in an opening 32c which extends through the tensioner housing 32 and a valve spring 42 that biases the piston 41 in a valve closing direction.

The sub-arm 29 is shaped in a substantially right-angled triangle. A right-angled portion is supported by the second shaft 28. A first abutting portion 29a disposed at one end of the short side of the sub-arm 29 abuts against an abutting portion 33a at the top of the plunger 33. A second abutting portion 29b disposed at one end of the long side of the sub-arm 29 abuts against an abutting portion 26a disposed in a lower portion of the main arm 26.

The abutting portion 33a of the plunger 33, the first and second abutting portions 29a and 29b of the sub-arm 29, and the abutting portion 26a of the main arm 26 each have a surface corresponding to that of part of a cylinder having an axis parallel to the first and second shafts 27 and 28. Specifically, each of the abutting portions 33a, 29a, 29b, and 26a is represented as an arc in FIG. 2. The arc extends such that it is projected in the direction perpendicular to the drawing sheet of FIG. 2. Accordingly, the abutting portion 33a of the plunger 33 is in line contact with the first abutting portion 29a of the sub-arm 29, the line being parallel to the above-described axis, and the second abutting portion 29b of the sub-arm 29 is in line contact with the abutting portion 26a of the main arm 26, the line being parallel to the above-described axis.

While the timing chain 21 wound around the drive sprocket 18 and the two driven sprockets 19 and 20 is rotated in accordance with the operation of the engine E, therefore, if the tension of the timing chain 21 changes due to, for example, fluctuations in rotational speed of the crankshaft 13, the power transmission performance may deteriorate or the durability of the timing chain 21 may deteriorate.

When the tension of the slack part of the timing chain 21 between the drive sprocket 18 and the driven sprocket 19 decreases and the contact pressure between the main arm 26 and the timing chain 21 therefore decreases in order to prevent such deterioration, the elastic force of the spring 34 allows the plunger 33 to move so as to project from the cylinder 32a, so that high-pressure hydraulic oil supplied through the oil path 32b of the tensioner lifter 31 pushes the check ball 38 to open the check valve 35 and flows into the cylinder 32a. As a result, the sub-arm 29 with the first abutting portion 29a pressed by the abutting portion 33a of the plunger 33 is swung clockwise about the second shaft 28. The second abutting portion 29b of the sub-arm 29 is pressed against the abutting portion 26a of the main arm 26, so that the main arm 26 is swung counterclockwise about the first shaft 27, thus pressing the slack part of the timing chain 21 to increase the tension.

In contrast, when the tension of the slack part of the timing chain 21 between the drive sprocket 18 and the driven sprocket 19 increases, the plunger 33 is compressed by a load transmitted from the timing chain 21 through the main arm 26 and the sub-arm 29, thereby increasing an internal pressure of the cylinder 32a. Thus, the check valve 35 is closed and the relief valve 36 is opened, so that the plunger 33 is moved so as to recede into the cylinder 32a while compressing the spring 34.

As described above, the plunger 33 of the tensioner lifter 31 recedes into or projects from the tensioner housing 32 in accordance with an increase or decrease in tension of the timing chain 21 to stabilize the tension of the timing chain 21. Thus, the power transmission performance and the durability of the timing chain 21 can be increased.

Figure 5:
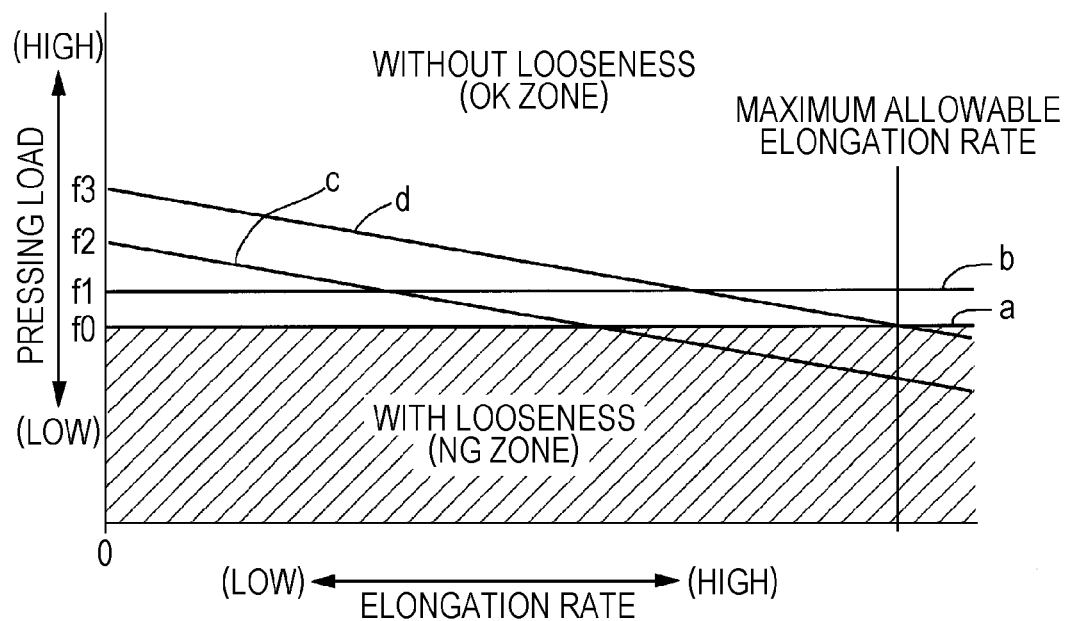
FIG. 5 is a graph illustrating the relationship between the elongation rate of a timing chain and a load acting on a main arm.

FIG. 5 illustrates a pressing load at which the main arm 26 presses the timing chain 21 plotted against the elongation rate of the timing chain 21. If the timing chain 21 elongates such that the elongation rate exceeds a maximum allowable elongation rate, the inner circumferential surfaces of the timing chain 21 interfere with each other or the timing chain 21 interferes with another member. An unacceptable (no good or NG) zone, which is hatched, under a line a on which the pressing load is a constant value of f0 is a region where the pressing load is insufficient and the timing chain 21 is therefore loosened. A line b on which the pressing load is a contact value of f1 (f1>f0) indicates an ideal characteristic.

The ideal characteristic (see the line b) has not been obtained by the following reason. Assuming that a pressing load is f2 (f2>f1) at an elongation rate of 0.0% as represented by a line c, as the elongation of the timing chain 21 proceeds, the spring 34 stretches, so that the elastic force of the spring 34 gradually decreases. Disadvantageously, the pressing load lies below the line a and enters the NG zone. When the set load of the spring 34 is increased such that a pressing load is f3 (f3>f2) at an elongation rate of 0.0% in order to prevent the above disadvantage, a pressing load becomes excessively high while the timing chain 21 does not elongate, thus disadvantageously increasing a sliding resistance between the main arm 26 and the timing chain 21.

According to the present embodiment, therefore, the load of the spring 34 transmitted from the plunger 33 of the tensioner lifter 31 to the main arm 26 is increased in accordance with an increase in elongation of the timing chain 21 and is set so as to reach its maximum value upon maximum elongation of the timing chain 21. This cancels out the characteristic of the elastic force of the spring 34 decreasing with an increase in elongation of the timing chain 21. The main arm 26 can be biased under a substantially constant load, irrespective of the amount of elongation of the timing chain 21.

A mechanism for increasing the load of the spring 34 transmitted from the plunger 33 of the tensioner lifter 31 to the main arm 26 in accordance with an increase in elongation of the timing chain 21 will be described with reference to FIGS. 6 and 7.

Figure 6:
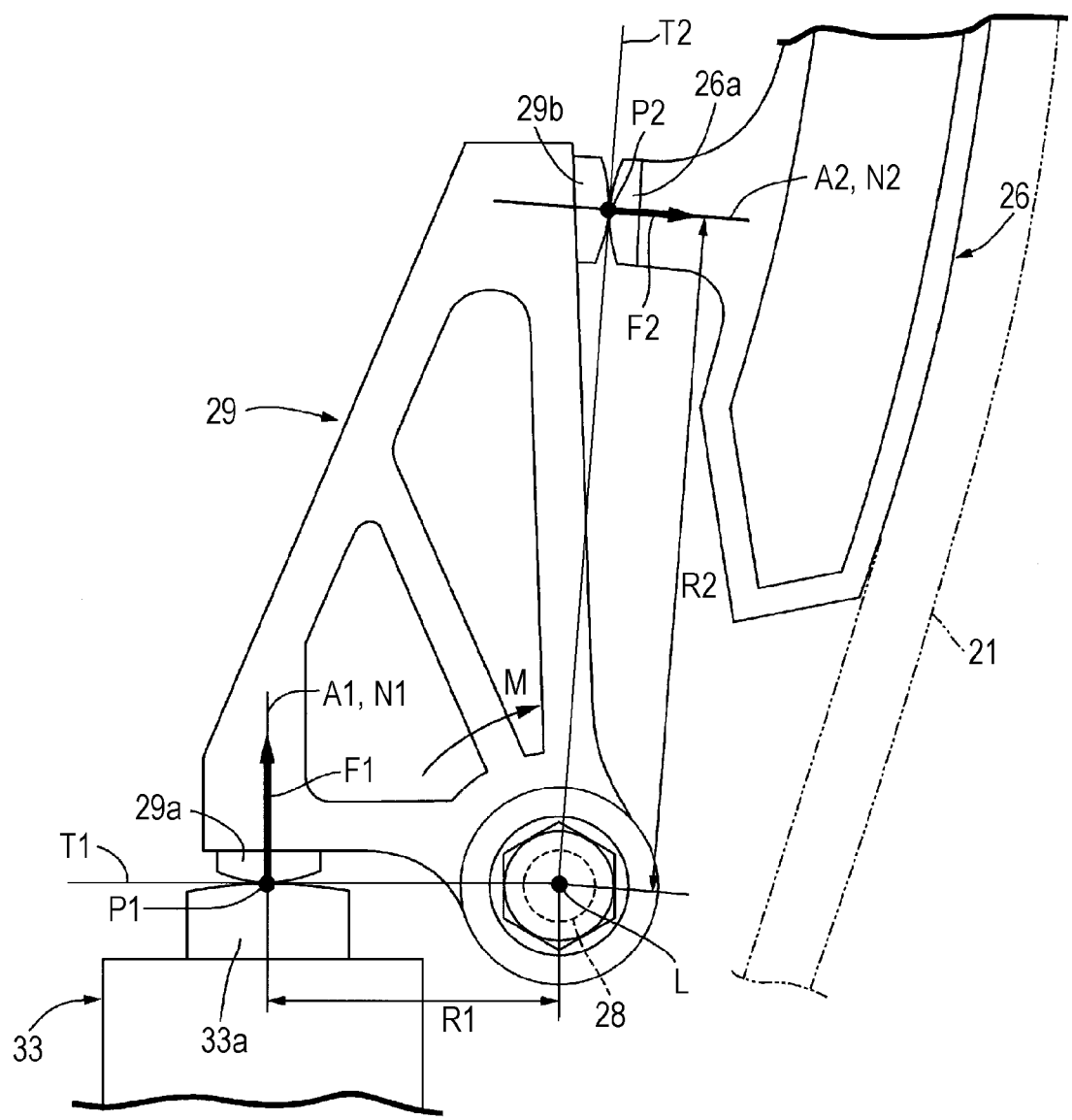
FIG. 6 is a diagram illustrating a state upon maximum elongation of the timing chain.

FIG. 6 illustrates a state upon maximum elongation of the timing chain 21. When P1 denotes a contact point (actually, line contact) between the abutting portion 33a of the plunger 33 and the first abutting portion 29a of the sub-arm 29, T1 indicates a tangent at the contact point P1 and N1 indicates a normal at the contact point P1. At this time, the second shaft 28 is positioned on the tangent T1 and the moving direction, indicated by A1, of the plunger 33 (namely, in the direction of the load, indicated by F1, of the spring 34) is parallel to the normal N1. Assuming that a friction force at the contact point P1 is negligible, since a load transmitted through the contact point P1 is a load applied in the direction of the normal N1, the whole of the load F1 of the spring 34 is transmitted in the direction of the normal N1, so that the clockwise moment, indicated by M, of the sub-arm 29 can be generated most efficiently. When R1 indicates a moment arm between the second shaft 28 and the contact point P1, the moment M is expressed by the following equation.

$$M = F1 \times R1$$

When P2 indicates a contact point (actually, line contact) between the second abutting portion 29b of the sub-arm 29 and the abutting portion 26a of the main arm 26, T2 indicates a tangent at the contact point P2 and N2 indicates a normal at the contact point P2. At this time, the second shaft 28 is positioned on the tangent T2 and the moving direction, indicated by A2, of the sub-arm 29 (namely, the direction of the load, indicated by F2, of the sub-arm 29) is parallel to the normal N2. Assuming that a friction force at the contact point P2 is negligible, since a load transmitted through the contact point P2 is a load in the direction of the normal N2, the whole of the load F2 of the sub-arm 29 is transmitted in the direction of the normal N2. The main arm 26 can be pressed most efficiently. When R2 indicates a moment arm between the second shaft 28 and the contact point P2, the load F2 at which the sub-arm 29 presses the main arm 26 is expressed by the following equation.

$$F2 = M/R2 = F \times (R1/R2)$$

Specifically, the load F2 at which the sub-arm 29 presses the main arm 26 is the product of the load F1 at which the plunger 33 presses the sub-arm 29 and R1/R2, serving as the inverse of the lever ratio of the sub-arm 29.

As described above, the moving direction A1 of the plunger 33 is orthogonal to the direction of the tangent T1 at the contact point P1 between the plunger 33 and the sub-arm 29 upon maximum elongation of the timing chain 21, so that the load F1 of the plunger 33 can be most efficiently transmitted to the sub-arm 29. In addition, the moving direction A2 of the sub-arm 29 is orthogonal to the direction of the tangent T2 at the contact point P2 between the sub-arm 29 and the main arm 26, so that the load F2 of the sub-arm 29 can be most efficiently transmitted to the main arm 26.

Figure 7:
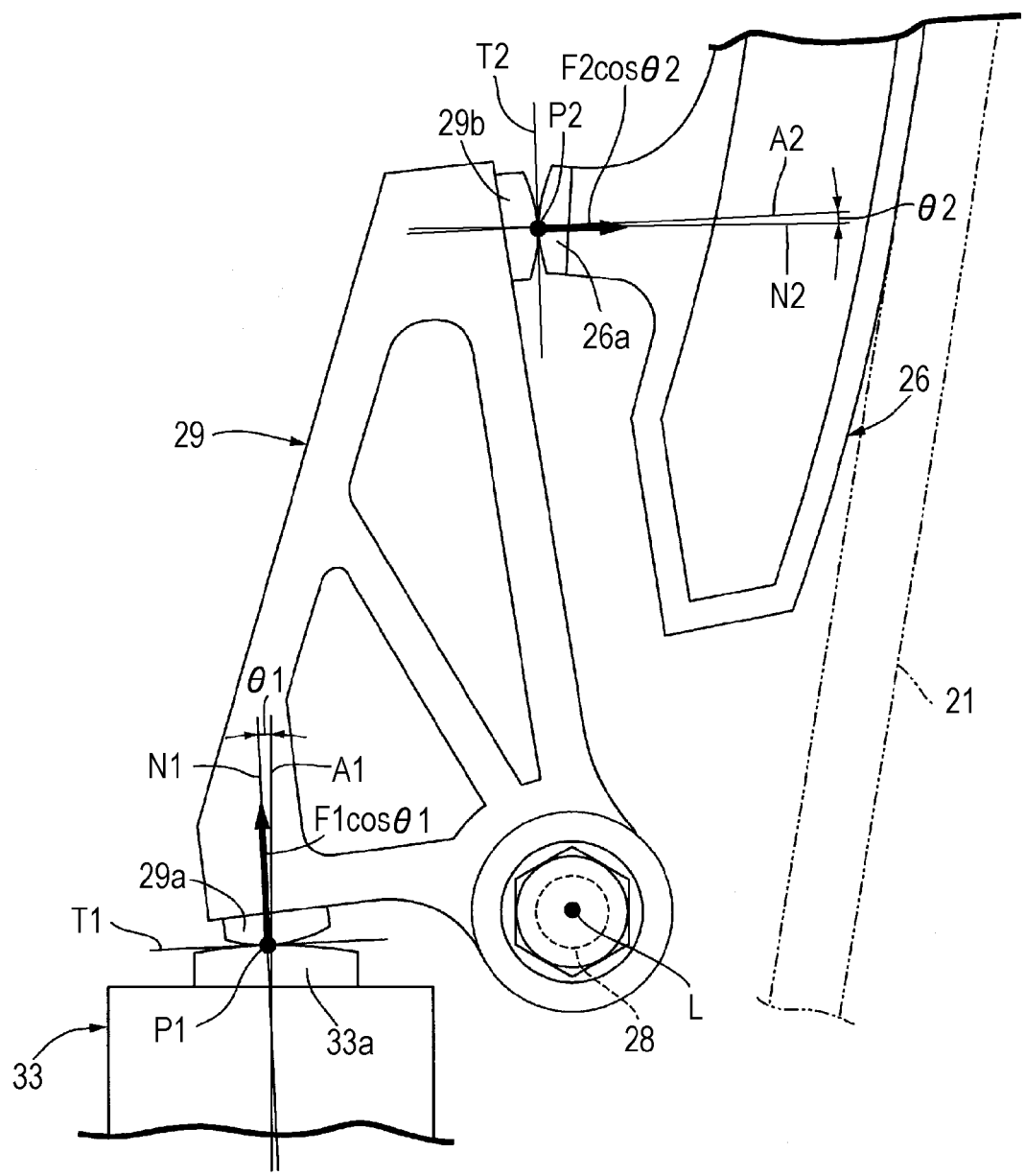
FIG. 7 is a diagram illustrating a state upon minimum elongation of the timing chain.

FIG. 7 illustrates a state before the elongation of the timing chain 21 reaches its maximum (for example, a state of a new product). The amount of projection of the plunger 33 is smaller, the amount of clockwise swing of the sub-arm 29 is smaller, and the amount of counterclockwise swing of the main arm 26 is smaller than those in the state upon maximum elongation of the timing chain 21.

Since the abutting portion 33a of the plunger 33 and the first abutting portion 29a of the sub-arm 29 are arc-shaped as viewed in the axial direction L of the second shaft 28, the position of the abutting portion 33a and that of the first abutting portion 29a at the contact point P1 are deviated to the left (on the side opposite to the second shaft 28) in FIG. 7 in accordance with the swing of the sub-arm 29 and the direction of the tangent T1 changes counterclockwise as compared to that in FIG. 6. Consequently, although the moving direction A1 of the plunger 33 is orthogonal to the tangent T1 at the contact point P1 in FIG. 6, the direction of the tangent T1 and that of the normal N1 rotate counterclockwise by an angle θ1 in FIG. 7, so that the moving direction A1 of the plunger 33 is deviated from the direction of the normal N1 by the angle θ1.

As described above, since the load F1 of the plunger 33 is transmitted only in the direction of the normal N1 at the contact point P1, the load F1 of the plunger 33 transmitted to the sub-arm 29 is reduced to F1×cos θ1, which is a component in the direction of the normal N1.

Since the second abutting portion 29b of the sub-arm 29 and the abutting portion 26a of the main arm 26 are arc-shaped as viewed in the axial direction L of the second shaft 28, the positions of the abutting portions 29b and 26 at the contact point P2 are deviated in accordance with the swing of the sub-arm 29 and the direction of the tangent T2 changes counterclockwise as compared to that in FIG. 6. Consequently, although the moving direction A2 of the sub-arm 29 is orthogonal to the tangent T2 at the contact point P2 in FIG. 6, the direction of the tangent T2 and that of the normal N2 rotate counterclockwise by an angle θ2 in FIG. 7, so that the moving direction A2 of the sub-arm 29 is deviated from the direction of the normal N2 by the angle θ2.

As described above, since the load F2 of the sub-arm 29 is transmitted only in the direction of the normal N2 at the contact point P2, the load F2 of the sub-arm 29 transmitted to the main arm 26 is reduced to F2×cos θ2, which is a component in the direction of the normal N2.

As described above, before the wearing away of the timing chain 21 reaches its maximum value, as its elongation is smaller, the load of the spring 34 of the tensioner lifter 31, namely, the load of the plunger 33 does not tend to be transmitted to the main arm 26. As the elongation of the timing chain 21 proceeds, the load of the plunger 33 tends to be transmitted to the main arm 26. This characteristic is opposite to the characteristic in which the spring 34 stretches with the proceeding of the elongation of the timing chain 21 to reduce the load of the plunger 33. When these characteristics are allowed to cancel out each other, therefore, a load at which the main arm 26 presses the timing chain 21 is maintained substantially constant, regardless of the amount of wearing away of the timing chain 21, thus preventing the looseness of the timing chain 21 while preventing the sliding resistance between the main arm 26 and the timing chain 21 from becoming excessively high.

A chain tensioner device according to a second embodiment of the present invention will be described below with reference to FIGS. 8 to 15.

Figures 8, 8A:
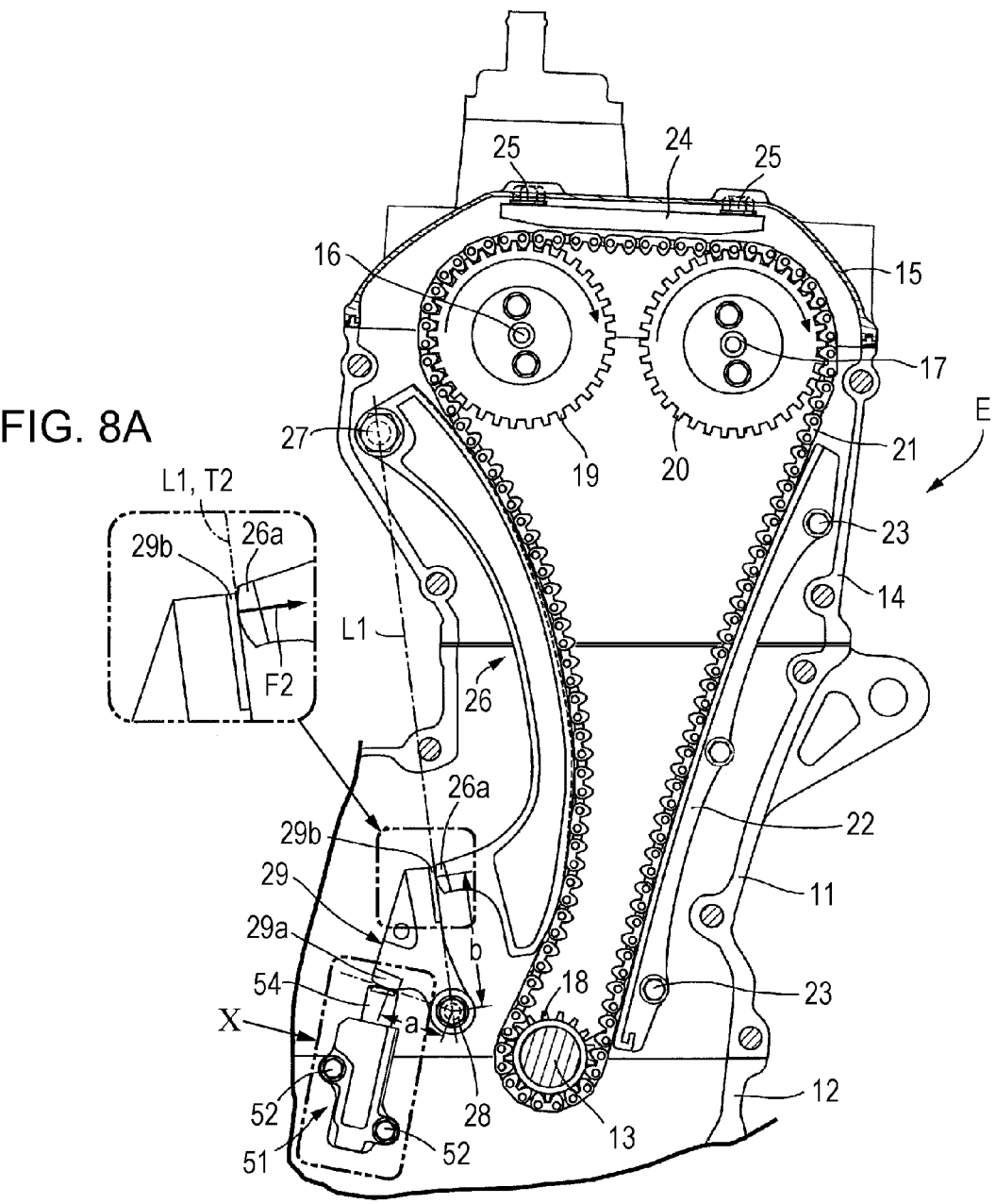
FIG. 8 is a front view of part of an engine uncovered with a chain cover in a second embodiment of the present invention (upon maximum elongation of a timing chain)
FIG. 8A is a partial enlarged portion of FIG. 8.
Figures 9, 9A:
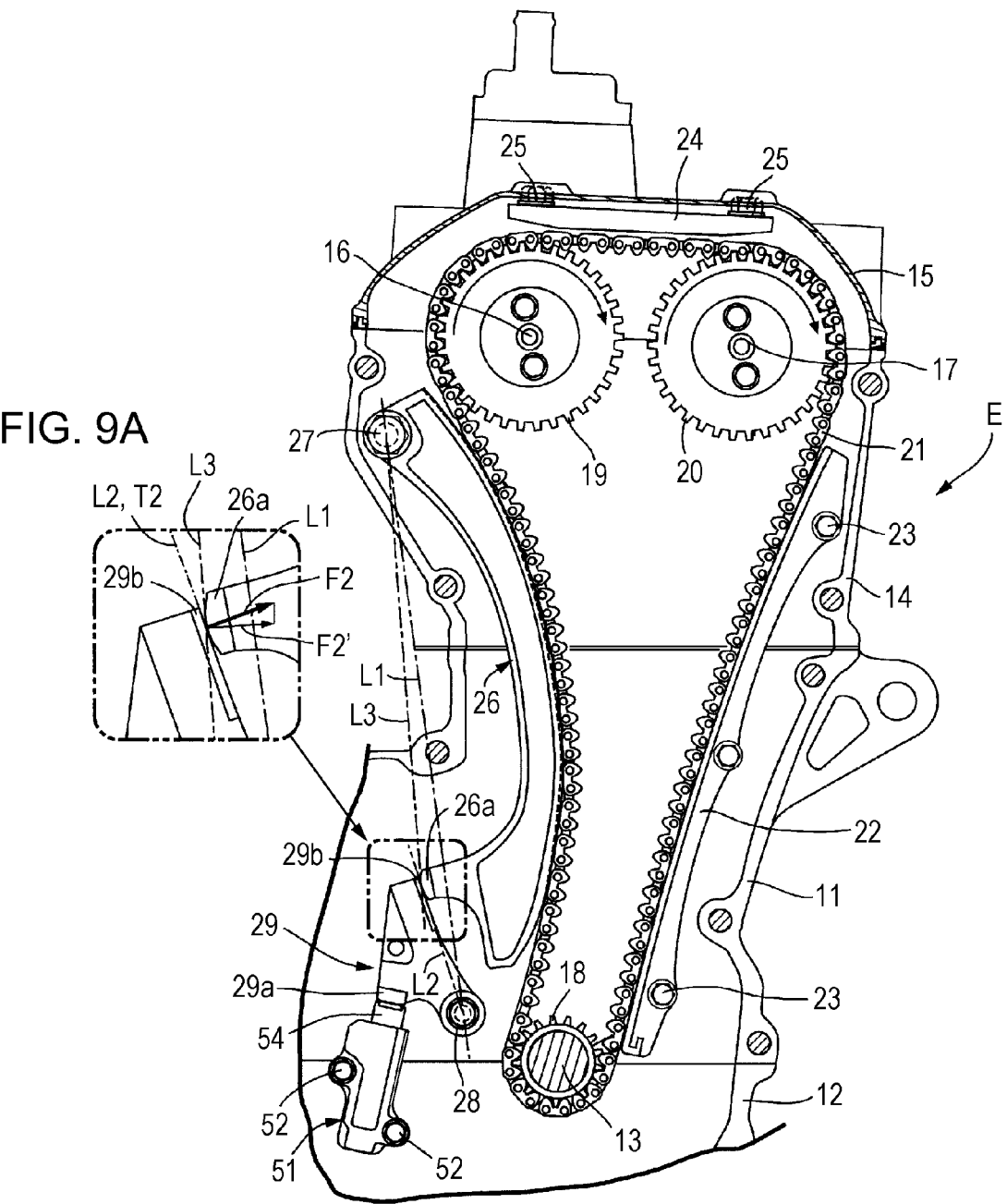
FIG. 9 is a front view of the part of the engine uncovered with the chain cover (upon minimum elongation of the timing chain)
FIG. 9A is a partial enlarged portion of FIG. 9.

In the first embodiment (see FIG. 1), the abutting portions 26a and 29b of the main arm 26 and the sub-arm 29 are always positioned on the side closer to the timing chain 21 relative to a line L1 connecting the first shaft 27 of the main arm 26 to the second shaft 28 of the sub-arm 29. According to the second embodiment, the abutting portions 26a and 29b of the main arm 26 and the sub-arm 29 are positioned on the opposite side of the line L1, connecting the first shaft 27 of the main arm 26 to the second shaft 28 of the sub-arm 29, from the timing chain 21 as illustrated in FIG. 9. When the elongation of the timing chain 21 reaches its maximum, the abutting portions 26a and 29b of the main arm 26 and the sub-arm 29 are positioned on the line L1 as illustrated in FIG. 8.

Although the abutting portion 26a of the main arm 26 has a curved surface, the second abutting portion 29b of the sub-arm 29 has a flat surface. When the elongation of the timing chain 21 is small, the direction of the tangent T2 between the abutting portions 26a and 29b is not parallel to the line L1 (see FIG. 9). When the elongation of the timing chain 21 reaches its maximum, the direction of the tangent T2 is parallel to the line L1 (see FIG. 8).

Figure 10:
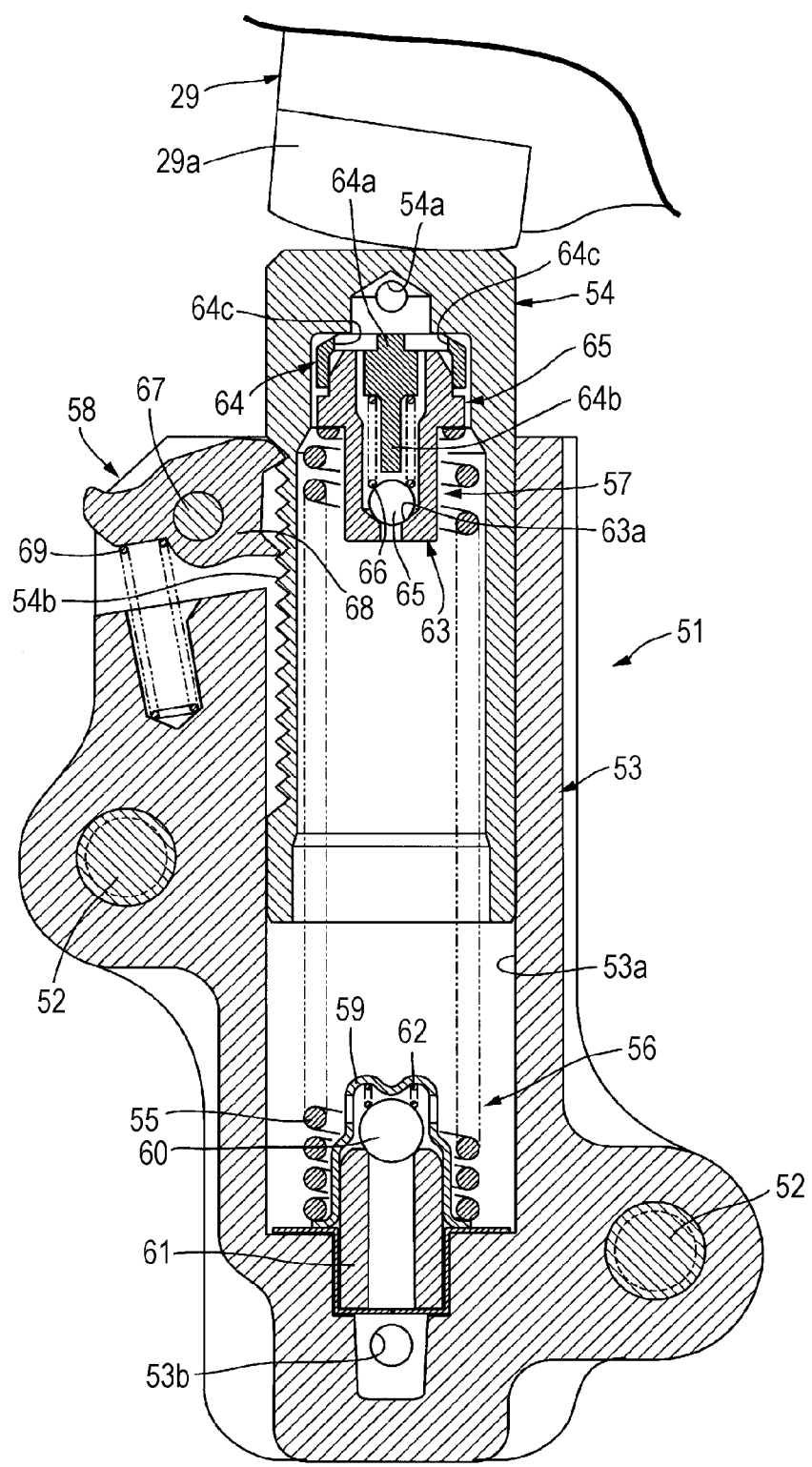
FIG. 10 is an enlarged view of part X in FIG. 8.

FIG. 10 demonstrates that a tensioner lifter 51 includes a tensioner housing 53 fixed to the cylinder block 11 with bolts 52, a plunger 54 slidably fitted in a cylinder 53a disposed in the tensioner housing 53, a spring 55 that biases the plunger 54 such that the plunger 54 projects from the cylinder 53a, a check valve 56 that supplies hydraulic oil to the cylinder 53a, a relief valve 57 that discharges the hydraulic oil from the cylinder 53a, and a cam mechanism 58 that controls the moving speed of the plunger 54.

The check valve 56 includes a check ball 60 received in a valve housing 59 and a valve spring 62 that urges the check ball 60 such that the check ball 60 is seated in a valve seat 61. The hydraulic oil, supplied from an oil pump (not illustrated), is supplied to the rear of the valve seat 61 through an oil path 53b disposed in the tensioner housing 53.

The relief valve 57, disposed in the plunger 54 that is hollow, includes a valve housing 63 which is pressed against and fixed to a wall of the plunger 54 through a flange portion 64a of a spring seat 64 by the elastic force of the spring 55. The valve housing 63 includes a valve seat 63a that communicates with the inside of the plunger 54. A check ball 65 facing the valve seat 63a is urged by a valve spring 66 disposed between the check ball 65 and a stopper portion 64b of the spring seat 64 such that the check ball 65 is seated in the valve seat 63a. An internal space of the valve housing 63 is open to the atmosphere through an opening 64c in the flange portion 64a of the spring seat 64 and an oil path 54a placed at the top of the plunger 54.

The cam mechanism 58 includes a cam plate 68 pivotally attached to the tensioner housing 53 through a pin 67, a rack 54b, disposed on the outer surface of the plunger 54, meshing with the cam plate 68, and a cam spring 69 biasing the cam plate 68 around the pin 67.

An action of the chain tensioner device according to the second embodiment with the above-described configuration will be described below.

As illustrated in FIG. 8, when the elongation of the timing chain 21 reaches its maximum, the abutting portions 26a and 29b of the main arm 26 and the sub-arm 29 are positioned on the line L1 connecting the first shaft 27 of the main arm 26 to the second shaft 28 of the sub-arm 29. Accordingly, both of the moving direction of the abutting portion 29b of the sub-arm 29 and that of the abutting portion 26a of the main arm 26 are orthogonal to the line L1. The direction of the load F2 at which the sub-arm 29 presses the main arm 26 is therefore orthogonal to the line connecting the second shaft 28 of the sub-arm 29 to the abutting portion 29b (namely, the line L1) and is also orthogonal to the line connecting the first shaft 27 of the main arm 26 to the abutting portion 26a (namely, the line L1), so that the load F2 is most efficiently transmitted to the main arm 26.

In contrast, when the elongation of the timing chain 21 is small, the abutting portions 26a and 29b of the main arm 26 and the sub-arm 29 are positioned on the opposite side of the line L1 from the timing chain 21 as illustrated in FIG. 9, the line L1 connecting the first shaft 27 of the main arm 26 to the second shaft 28 of the sub-arm 29. Accordingly, the efficiency with which the load F2 of the sub-arm 29 presses the main arm 26 is lower than that upon maximum elongation of the timing chain 21. Specifically, the direction of the load F2 at which the sub-arm 29 presses the main arm 26 is orthogonal to a line L2 connecting the second shaft 28 and the abutting portion 29b of the sub-arm 29 but the direction of the load F2 is not identical to the direction orthogonal to a line L3 connecting the first shaft 27 and the abutting portion 26a of the main arm 26. Only a component F2' of the load F2 can therefore effectively press the main arm 26. This results in a decrease in efficiency with which the sub-arm 29 presses the main arm 26.

The plunger 54 of the tensioner lifter 51 projects as the timing chain 21 elongates. If the load F1 at which the valve spring 66 presses the plunger 54 against the sub-arm 29 gradually decreases, therefore, the positions of the abutting portions 26a and 29b of the main arm 26 and the sub-arm 29 gradually approach the line L1 connecting the first shaft 27 of the main arm 26 to the second shaft 28 of the sub-arm 29 to increase the transmission efficiency of the load F2. Thus, the main arm 26 can be pressed against the timing chain 21 under a substantially constant load while the decrease of the load F1 is compensated for.

This advantage will be described with reference to FIG. 11 which corresponds to FIG. 5 related to the first embodiment. The boundary between an acceptable (OK) zone and an unacceptable (NG) zone corresponds to a line a on which the pressing load is a constant value f0. A line b on which the pressing load is a constant value f1 higher than the constant value f0 indicates an ideal characteristic. In the related-art chain tensioner device, the pressing load gradually decreases as the elongation of the timing chain 21 increases. If the pressing load is intended to be maintained at f1 upon maximum elongation of the timing chain 21, a pressing load becomes excessively high (see a line e) while the timing chain 21 does not elongate. Disadvantageously, the sliding resistance between the main arm 26 and the timing chain 21 increases.

Figure 11:
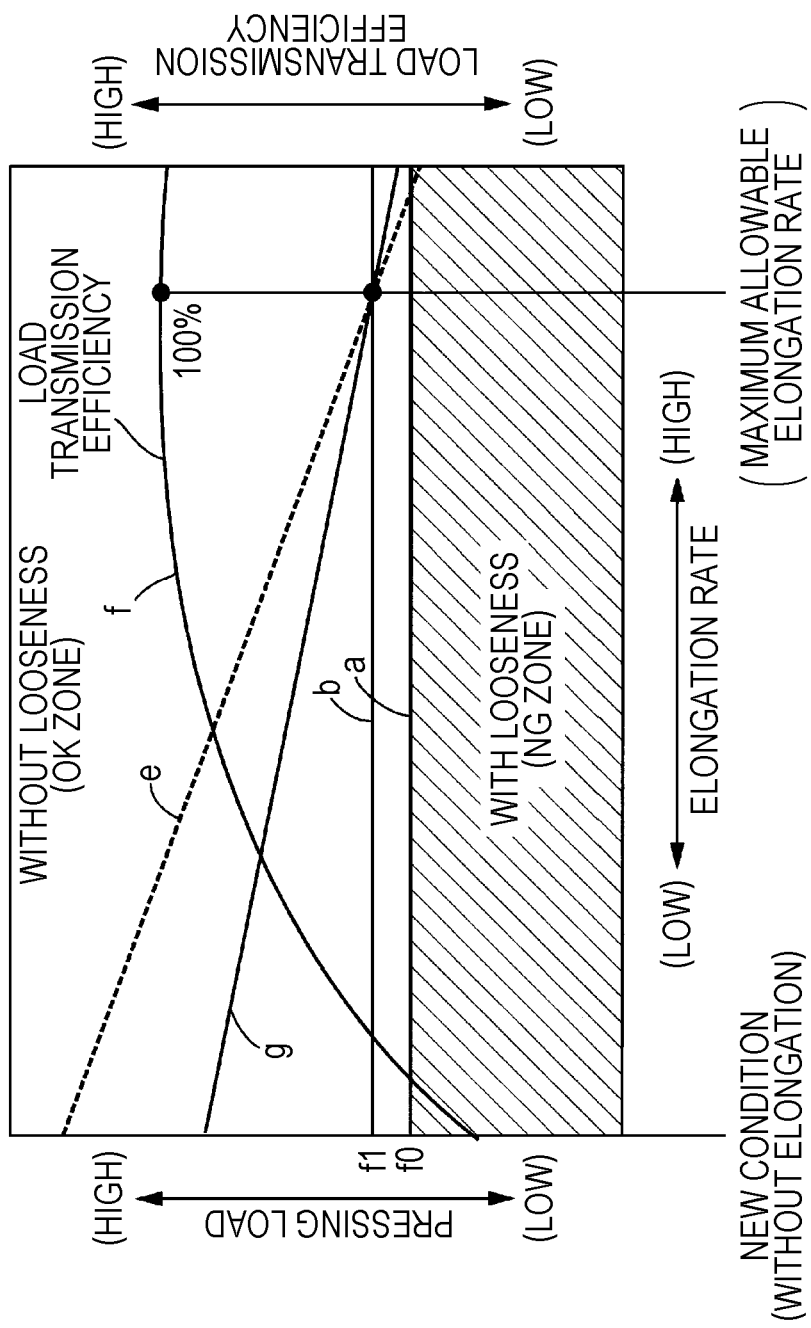
FIG. 11 is a graph illustrating the relationship between the elongation rate of the timing chain and a load acting on a main arm.

In FIG. 11, a line f indicates the characteristic of efficiency of load transmission from the sub-arm 29 to the main arm 26. As described above, the transmission efficiency is the highest upon maximum elongation of the timing chain 21 and is low while the timing chain 21 does not elongate. Accordingly, a line g indicating the product of the pressing load characteristic indicated by the line e and the transmission efficiency indicated by the line f represents a pressing load characteristic according to the present embodiment. The pressing load characteristic can be closer to the ideal characteristic indicated by the line b.

Although the action of the check valve 56 in the tensioner lifter 51 in the second embodiment is the same as that of the check valve 35 in the tensioner lifter 31 in the first embodiment, the structure and action of the relief valve 57 in the second embodiment differ from those of the relief valve 36 in the first embodiment. Specifically, as the tension of the slack part of the timing chain 21 between the drive sprocket 18 and the driven sprocket 19 increases, the plunger 54 is compressed by a load transmitted from the timing chain 21 through the main arm 26 and the sub-arm 29 to increase an internal pressure of the cylinder 53a. Thus, the check valve 56 is closed and the relief valve 57 is opened, so that the check ball 65 is moved away from the valve seat 63a while compressing the valve spring 66 and oil in the cylinder 53a is discharged to the outside while passing through the inside of the valve housing 63, the opening 64c of the spring seat 64, and the oil path 54a of the plunger 54. Consequently, the plunger 54 moves backward so as to recede into the cylinder 53a.

The relief valve 36 in the first embodiment is of the piston relief type and includes, as a valve element, the piston 41 whose weight is relatively heavy. On the other hand, the relief valve 57 in the second embodiment is of the ball relief type and includes, as a valve element, the check ball 65 whose weight is relatively light. The use of the relief valve 57 in the chain tensioner device including the main arm 26 and the sub-arm 29 therefore offers the following advantages.

Figure 12:
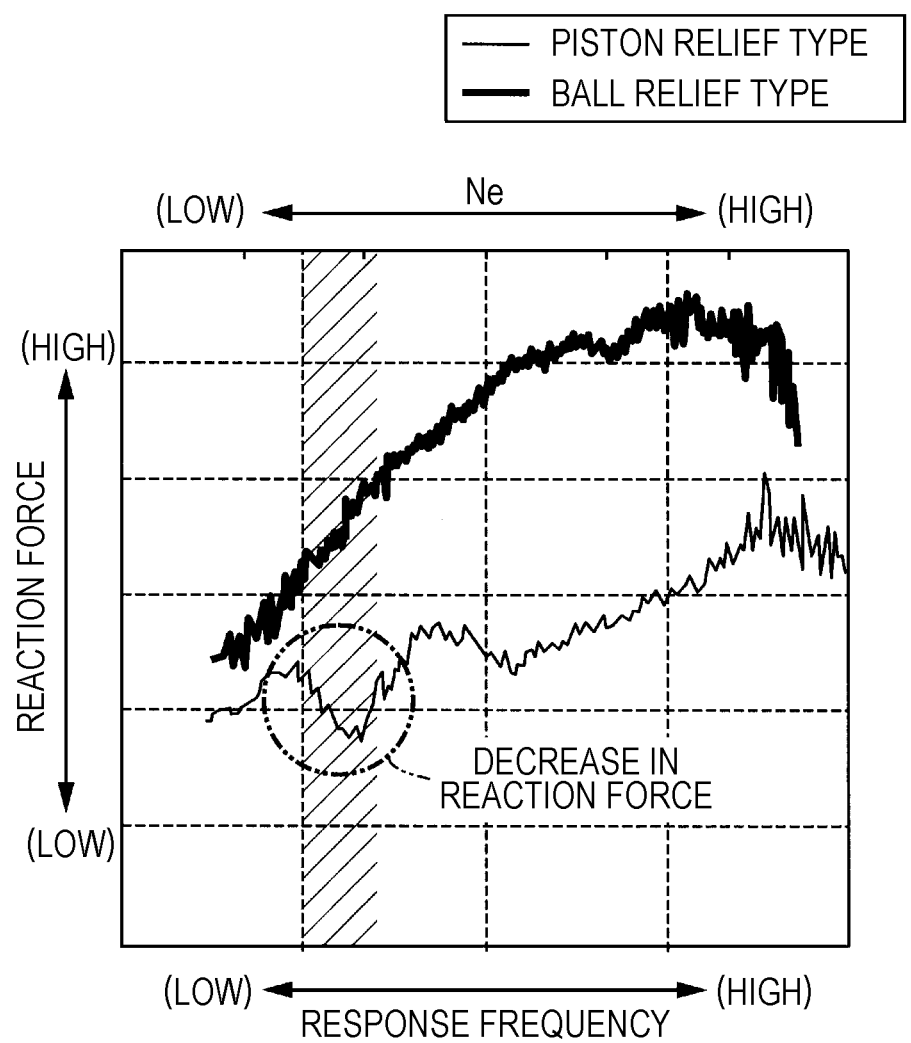
FIG. 12 is a graph illustrating the relationship between the response frequency and reaction force of a chain tensioner device according to the second embodiment.
Figure 13:
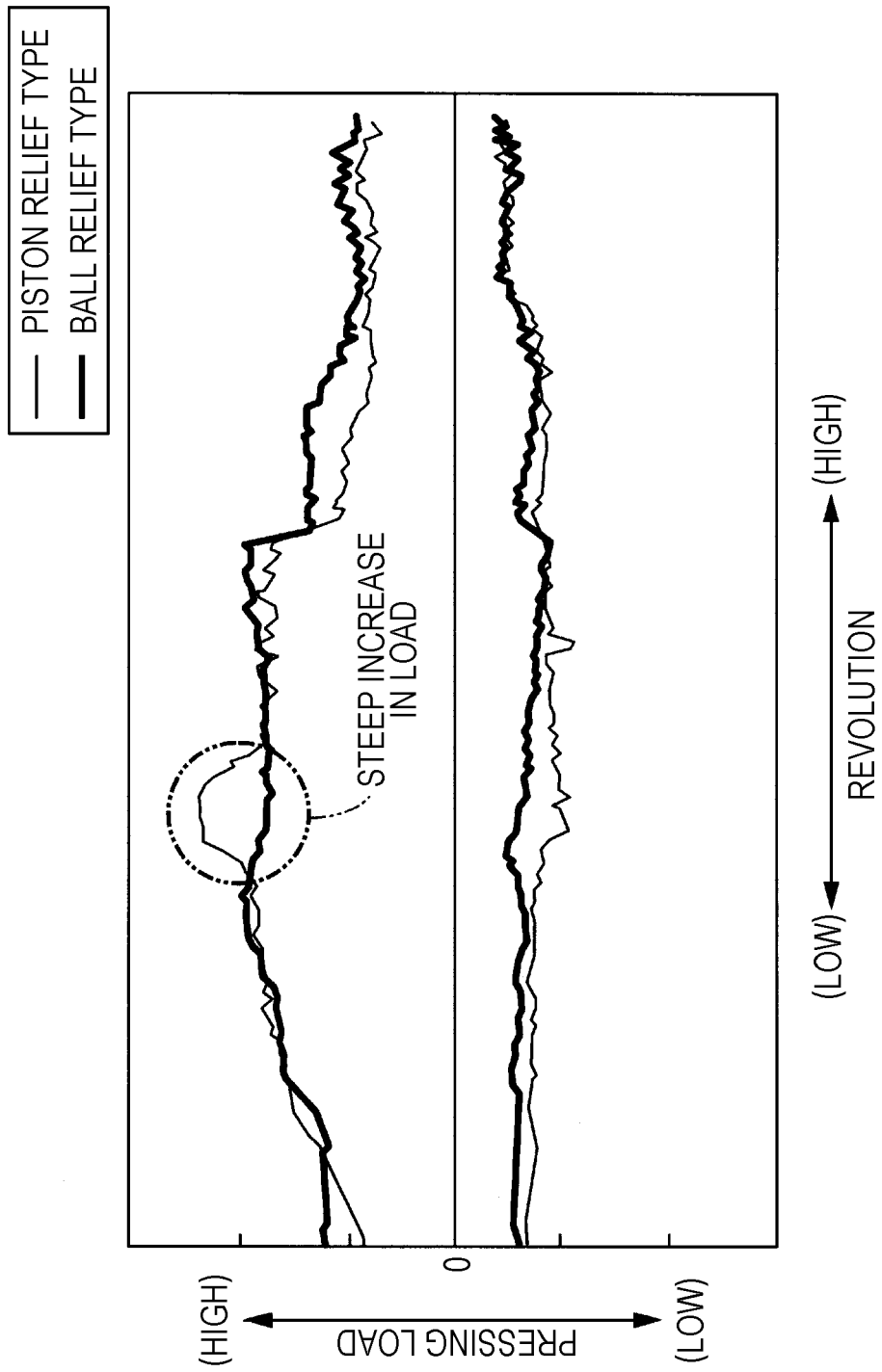
FIG. 13 is a graph illustrating the number of engine revolutions and a load acting on the main arm.

Since the piston type relief valve 36 includes, as a valve element, the piston 41 which is heavy in weight, the valve vibrates at a specific number of revolutions Ne (in the range of 3000 to 4000 rpm) of the engine E, so that the motion of this valve slows down and its followability deteriorates. This causes poor closing of the valve seat and oil leakage. Disadvantageously, reaction force decreases as illustrated in FIG. 12. As illustrated in FIG. 13, therefore, the chain tensioner device cannot follow the motion of the timing chain 21 at a number of engine revolutions of about 3500 rpm. Disadvantageously, the chain tensioner device and the timing chain 21 impact each other, thus steeply increasing a load applied to the timing chain 21.

Figure 14:
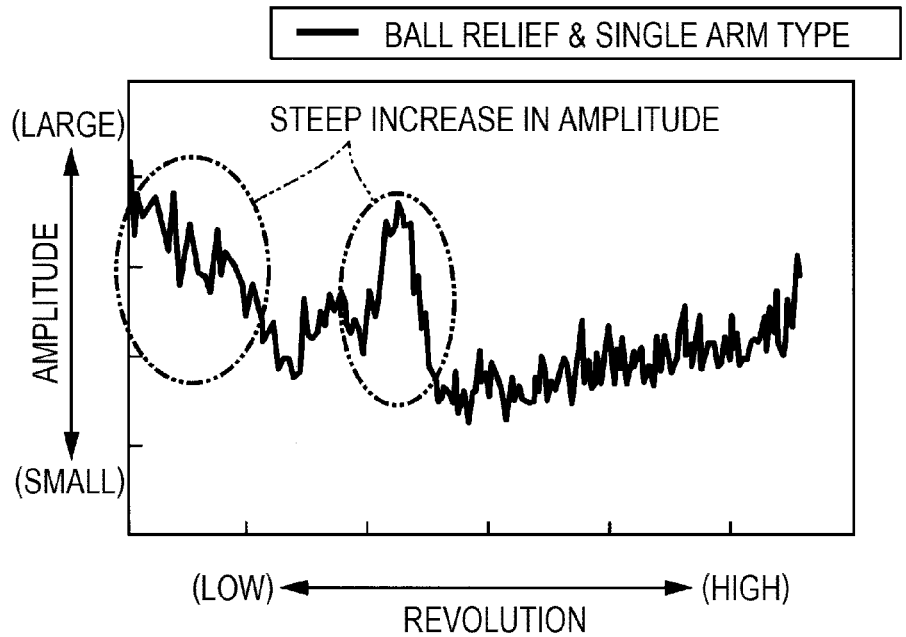
FIG. 14 is a graph illustrating the relationship between the number of engine revolutions and the amplitude of a plunger in a single-arm chain tensioner device.

FIG. 14 illustrates a result obtained when the ball type relief valve 57 is used in a single-arm chain tensioner device which includes the main arm 26 but excludes the sub-arm 29. In the ball type relief valve 57, since the check ball 65 is light in weight and it is in direct contact with the valve seat 63a, the valve seat 63a is opened or closed by only slight movement of the check ball 65. Therefore, the followability is good in a range where the number of revolutions of the engine E is high but the check ball 65 is significantly separated from the valve seat 63a in a range where the number of revolutions of the engine E is low. Disadvantageously, the amplitude of the plunger 54 is excessively large.

Figure 15:
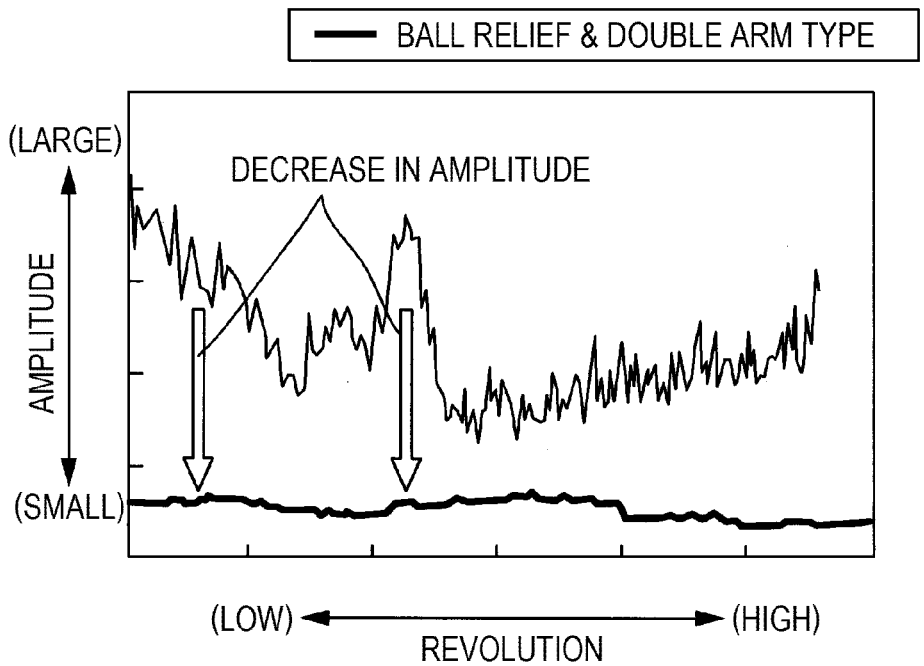
FIG. 15 is a graph illustrating the relationship between the number of engine revolutions and the amplitude of a plunger in a double-arm chain tensioner device.

FIG. 15 illustrates a result obtained when the ball type relief valve 57 is used in a double-arm chain tensioner device which includes both of the main arm 26 and the sub-arm 29 (namely, the chain tensioner device according to the present embodiment). FIG. 15 demonstrates that the amplitude of the plunger 54 is remarkably reduced in all ranges including the range where the amplitude of the plunger 54 is excessively large in FIG. 14. The reason is that since the sub-arm 29 has a lever ratio of b/a (see FIG. 8) in the double-arm chain tensioner device, the amount of displacement of the plunger 54 can be reduced relative to that of the main arm 26.

As described above, the use of not the piston type relief valve 36 but the ball type relief valve 57 in the double-arm chain tensioner device can stabilize the operation of the tensioner lifter 51.

While the present invention has been described by reference to specific embodiments, it is to be understood that the present invention is not limited to the specific embodiments but variations and modifications of the invention may be made without departing from the scope of the invention defined in the following claims.

For example, the embodiment of the present invention may include the combination of any of the features of the first embodiment and any of the features of the second embodiment.

In the first and second embodiments, the abutting portion 33a of the plunger 33 and the first abutting portion 29a of the sub-arm 29 each have a curved surface. The first abutting portion 29a of the sub-arm 29 may have a flat surface and only the abutting portion 33a of the plunger 33 may have a curved surface. It is necessary that the abutting portion 33a of the plunger 33 have a curved surface. The reason is as follows. If the abutting portion 33a of the plunger 33 has a flat surface, the plunger 33 moves only linearly in the moving direction A1. Accordingly, the direction of the tangent T1 at the contact point P1 is constant, so that the load F1, transmitted to the sub-arm 29, in the direction of the normal N1 is constant.

In the first embodiment, the second abutting portion 29b of the sub-arm 29 and the abutting portion 26a of the main arm 26 each have a curved surface. One of them may have a curved surface and the other one may have a flat surface. If one of the second abutting portion 29b of the sub-arm 29 and the abutting portion 26a of the main arm 26 has a flat surface, the load F2, transmitted to the main arm 26, in the direction of the normal N2 does not become constant because the direction of the tangent T2 at the contact point P2 in the flat surface changes due to the swinging motion of the sub-arm 29 or the main arm 26.

In the second embodiment, the second abutting portion 29b of the sub-arm 29 has a flat surface and the abutting portion 26a of the main arm 26 has a curved surface. Each of them may have a curved surface. Assuming that each of them has a curved surface, a decrease in transmission efficiency is larger when the positions of the abutting portions 26a and 29b of the main arm 26 and the sub-arm 29 deviate from the line L1. Accordingly, a change in load at which the main arm 26 is pressed against the timing chain 21 when the timing chain 21 elongates can be further reduced.

In the first and second embodiments, the second shaft 28 is provided in the lower end of the sub-arm 29. The second shaft 28 may be placed in the upper end of the sub-arm 29. However, the placement of the second shaft 28 in the lower end of the sub-arm 29 is more advantageous in terms of reduction in width of the engine E.

In the first and second embodiments, the tensioner lifter 31 is of the hydraulic type. The embodiment of the present invention is applicable to a mechanical tensioner lifter that biases a plunger only using a spring without hydraulics.

In the first and second embodiments, the number of driven sprockets (19 and 20) is two. The number of driven sprockets may be one.

It is unnecessary that the main arm 26 be a rigid body. The main arm 26 may be an elastic body (made of, for example, plastic).

According to the embodiment of the present invention, a chain tensioner device includes the following elements. A main arm swingably pivotally supported by a first shaft is in sliding contact with an endless chain to apply a predetermined tension to the endless chain, the endless chain being wound around a drive sprocket provided for a drive shaft and a driven sprocket provided for a driven shaft. A tensioner lifter includes a housing, a plunger slidably held by the housing, and a spring and allows the spring to bias the plunger such that the plunger projects from the housing in order to generate a biasing force for biasing the main arm toward the endless chain. A sub-arm, disposed between the main arm and the tensioner lifter, is swingably pivotally supported by a second shaft to transmit the biasing force applied from the plunger of the tensioner lifter to the main arm. When the elongation of the endless chain reaches its maximum, the moving direction of the plunger is orthogonal to the direction of a tangent between an abutting portion of the plunger and an abutting portion of the sub-arm.

According to the embodiment of the present invention, the plunger slidably supported by the housing of the tensioner lifter is spring-biased such that the plunger projects from the housing, the biasing force applied from the plunger biases the sub-arm supported swingably about the second shaft, and the biasing force applied through the sub-arm biases the main arm supported swingably about the first shaft, thus applying the predetermined tension to the endless chain in sliding contact with the main arm. Since the moving direction of the plunger is orthogonal to the direction of the tangent between the abutting portions of the plunger and the sub-arm upon maximum elongation of the endless chain, the efficiency of transmission of the load from the plunger to the sub-arm reaches its maximum at this time. When the elongation of the endless chain does not reach its maximum, the efficiency of transmission of the load from the plunger to the sub-arm is lower than the maximum efficiency. As the elongation of the endless chain increases, the spring stretches so that an increase in the transmission efficiency compensates for a reduction in the load from the plunger. Advantageously, the main arm can be pressed against the endless chain under a substantially constant load, irrespective of the magnitude of elongation of the endless chain.

In the embodiment, at least the abutting portion of the plunger of the abutting portions of the plunger and the sub-arm may be arc-shaped as viewed in the axial direction of the second shaft.

When the elongation of the endless chain does not reach its maximum, an angle formed by the moving direction of the plunger and the direction of the tangent between the abutting portions is significantly deviated from 90 degrees, thus remarkably reducing the load transmitted from the plunger to the sub-arm.

According to the embodiment of the present invention, a chain tensioner device includes the following elements. A main arm swingably pivotally supported by a first shaft is in sliding contact with an endless chain to apply a predetermined tension to the endless chain, the endless chain being wound around a drive sprocket provided for a drive shaft and a driven sprocket provided for a driven shaft. A tensioner lifter includes a housing, a plunger slidably held by the housing, and a spring and allows the spring to bias the plunger such that the plunger projects from the housing in order to generate a biasing force for biasing the main arm toward the endless chain. A sub-arm, disposed between the main arm and the tensioner lifter, is swingably pivotally supported by a second shaft to transmit the biasing force applied from the plunger of the tensioner lifter to the main arm. An abutting portion of the sub-arm and an abutting portion of the main arm are positioned on a line connecting the first shaft to the second shaft or on the opposite side of the line from the endless chain.

According to the embodiment, the plunger slidably supported by the housing of the tensioner lifter is spring-biased such that the plunger projects from the housing, the biasing force applied from the plunger biases the sub-arm supported swingably about the second shaft, and the biasing force applied through the sub-arm biases the main arm supported swingably about the first shaft, thus applying the predetermined tension to the endless chain in sliding contact with the main arm. When the elongation of the endless chain increases, the abutting portions move closer to the line, thus increasing the efficiency of transmission of the load from the sub-arm to the main arm. As the elongation of the endless chain increases, the spring stretches so that an increase in the transmission efficiency compensates for a reduction in the load from the plunger. Advantageously, the main arm can be pressed against the endless chain under a substantially constant load, irrespective of the magnitude of elongation of the endless chain.

In the embodiment, when the elongation of the endless chain reaches its maximum, the abutting portions of the sub-arm and the main arm may be positioned on the line connecting the first shaft to the second shaft.

Advantageously, the efficiency of transmission of the load from the sub-arm to the main arm can be maximized upon maximum elongation of the endless chain. As the elongation of the endless chain increases, the spring stretches so that an increase in the transmission efficiency can surely compensate for a reduction in the load from the plunger.

In the embodiment, the moving direction of the sub-arm may be orthogonal to the direction of a tangent between the abutting portions of the sub-arm and the main arm.

Advantageously, the efficiency of transmission of the load from the sub-arm to the main arm can be further increased.

In the embodiment, at least one of the abutting portions of the sub-arm and the main arm may be arc-shaped as viewed in the axial direction of the second shaft.

When the elongation of the endless chain does not reach its maximum, an angle formed by the moving direction of the sub-arm and the direction of the tangent between the abutting portions is significantly deviated from 90 degrees, thus remarkably reducing the load transmitted from the sub-arm to the main arm.

In the embodiments of the present invention, the drive shaft corresponds to a crankshaft 13 in an embodiment, the driven shaft corresponds to an intake camshaft 16 and an exhaust camshaft 17 in the embodiment, the endless chain corresponds to a timing chain 21 in the embodiment, the abutting portions correspond to first and second abutting portions 29a and 29b in the embodiment, and the housing corresponds to a tensioner housing 32 in the embodiment.

Obviously, numerous modifications and variations of the present invention are possible in light of the above teachings. It is therefore to be understood that within the scope of the appended claims, the invention may be practiced otherwise than as specifically described herein.

What is claimed is:

1. A chain tensioner device comprising:
   a main arm pivotally supported by a first shaft, the main arm slidably contacting an endless chain to apply a tension to the endless chain, the endless chain being wound around a drive sprocket connected to a drive shaft and a driven sprocket connected to a driven shaft;
   a tensioner lifter comprising:
      a housing;
      a plunger slidably held by the housing; and
      a spring to press the plunger such that the plunger projects from the housing in order to generate a biasing force to press the main arm toward the endless chain;
   a sub-arm disposed between the main arm and the tensioner lifter, the sub-arm being pivotally supported by a second shaft about a rotational axis to transmit the biasing force applied by the plunger of the tensioner lifter to the main arm; and
   a moving direction of the plunger being substantially orthogonal to a direction of a tangent at a contact portion between an abutting portion of the plunger and a first abutting portion of the sub-arm when an elongation of the endless chain reaches a maximum elongation, wherein the tangent extends in a plane perpendicular to the rotational axis, wherein at least one of the abutting portion of the plunger and the first abutting portion of the sub-arm has an arc-shape as viewed in a direction parallel to the rotational axis, and wherein sub-arm has a second abutting portion configured to contact an abutting portion of the main arm, the second abutting portion of the sub-arm, which abuts the abutting portion of the main arm, having a flat surface.

2. A chain tensioner device comprising:

a main arm pivotally supported by a first shaft, the main arm slidably contacting an endless chain to apply a tension to the endless chain, the endless chain being wound around a drive sprocket connected to a drive shaft and a driven sprocket connected to a driven shaft;

a tensioner lifter comprising:
  a housing;
  a plunger slidably held by the housing; and
  a spring to press the plunger such that the plunger projects from the housing in order to generate a biasing force to press the main arm toward the endless chain;

a sub-arm disposed between the main arm and the tensioner lifter, the sub-arm being pivotally supported by a second shaft about a rotational axis to transmit the biasing force applied by the plunger of the tensioner lifter to the main arm; and a contact portion between an abutting portion of the sub-arm and an abutting portion of the main arm being positioned on a line connecting the first shaft to the second shaft or on an opposite side of the line from the endless chain as viewed in a direction parallel to the rotational axis, wherein the abutting portion of the sub-arm, which abuts the abutting portion of the main arm, has a flat surface, and wherein the flat surface becomes parallel to the line connecting the first shaft to the second shaft when an elongation of the endless chain reaches a maximum elongation.

3. The device according to claim 2, wherein the abutting portion of the sub-arm and the abutting portion of the main arm are positioned on the line connecting the first shaft to the second shaft when the elongation of the endless chain reaches the maximum elongation.

4. The device according to claim 3, wherein a moving direction of the sub-arm is substantially orthogonal to a direction of a tangent at a contact portion between the sub-arm and the main arm, wherein the tangent extends in a plane perpendicular to the rotational axis, and wherein at least one of the abutting portion of the sub-arm and the abutting portion of the main arm has an arc-shape as viewed in the direction parallel to the rotational axis.

* * * * *